United States Patent
Sakamoto et al.

(10) Patent No.: US 7,224,414 B2
(45) Date of Patent: May 29, 2007

(54) ACTIVE MATRIX LIQUID CRYSTAL DISPLAY DEVICE

(75) Inventors: Michiaki Sakamoto, Tokyo (JP); Muneo Maruyama, Tokyo (JP); Yuji Yamamoto, Tokyo (JP); Mamoru Okamoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 230 days.

(21) Appl. No.: 10/761,354

(22) Filed: Jan. 22, 2004

(65) Prior Publication Data

US 2004/0150763 A1 Aug. 5, 2004

Related U.S. Application Data

(62) Division of application No. 09/870,749, filed on Jun. 1, 2001, now Pat. No. 6,822,704.

(30) Foreign Application Priority Data

Jun. 2, 2000 (JP) ............... 2000-166318

(51) Int. Cl.
*G02F 1/136* (2006.01)

(52) U.S. Cl. ........................................ 349/44

(58) Field of Classification Search .............. 349/44, 349/110, 138
See application file for complete search history.

(56) References Cited

U.S. PATENT DOCUMENTS 5,510,916 A * 4/1996 Takahashi ............ 349/110
5,566,011 A 10/1996 Steigerwald
5,574,582 A 11/1996 Takeda et al.
5,666,177 A 9/1997 Hsieh et al.
5,718,992 A 2/1998 Sato et al.
6,011,604 A 1/2000 Miyazawa
2005/0030441 A1* 2/2005 Song ..................... 349/43

FOREIGN PATENT DOCUMENTS

| JP | 01-266512 | 10/1989 |
|----|-----------|---------|
| JP | 06-273802 | 9/1994 |
| JP | 06-347766 | 12/1994 |
| JP | 10-104664 | 4/1998 |
| JP | 2000-66237 | 3/2000 |

OTHER PUBLICATIONS

Taiwanese Office Action dated Jan. 6, 2004 with partial English translation.

* cited by examiner

*Primary Examiner*—Toan Ton
(74) *Attorney, Agent, or Firm*—McGinn IP Law Group, PLLC

(57) ABSTRACT

An active matrix liquid crystal display device which has color filters disposed on a TFT (Thin-Film Transistor) substrate, and which reduces the effect of light leakage regions over data lines for an increased viewing angle. The liquid crystal display device has the data lines disposed on the TFT substrate at respective gaps between adjacent two of pixel electrodes, for supplying data signals to TFTs to drive pixel electrodes, and a black matrix disposed on the TFT substrate in association with the data lines for blocking light passing in a predetermined viewing angle range through a light leakage region created in the liquid crystal layer depending on a potential difference between adjacent two of the pixel electrodes.

21 Claims, 3 Drawing Sheets

ACTIVE MATRIX LIQUID CRYSTAL DISPLAY DEVICE

The present Application is a Divisional Application of U.S. patent application Ser. No. 09/870,749, filed on Jun. 1, 2001 now U.S. Pat. No. 6,822,704.

BACKGROUND OF THE INVENTION

1. Field of the Invention

The present invention relates to an active matrix liquid crystal display device.

2. Description of the Related Art

Heretofore, active matrix liquid crystal display devices capable of displaying color images have been of a structure including a TFT (Thin-Film Transistor) substrate with TFTs and pixel electrodes disposed thereon in association with respective pixels, an opposing substrate with color filters and a common electrode disposed thereon, and a liquid crystal layer sealed between the TFT substrate and the opposing substrate. In this structure, the color filters and the pixel electrodes need to be positioned accurately in alignment with each other. In order to prevent an unwanted leakage of light, a light shielding layer referred to as a black matrix is required to be positioned between the color filters which are combined with the respective pixels on the opposing substrate. In view of these requirements, it has been proposed to fabricate color filters on a TFT substrate. With color filters fabricated on a TFT substrate, an opposing substrate can be constructed of a transparent substrate and a transparent common electrode fabricated uniformly over the transparent substrate. Therefore, the process of manufacturing active matrix liquid crystal display devices is simplified, and it is relatively easy to achieve precise alignment between the opposing substrate and the TFT substrate. In addition, various interconnections on the TFT substrate can be used as a light shielding layer.

FIG. 1 shows in schematic cross section of a conventional active matrix liquid crystal display device with color filters mounted on a TFT substrate.

As shown in FIG. 1, TFT substrate 10 comprises transparent glass substrate 11 which supports on one major surface thereof a plurality of patterned data lines 12 extending parallel to each other, color layers 13 of color filters and transparent overcoat layer 14 which are successively deposited on the major surface of transparent glass substrate 11, and transparent pixel electrodes 15 disposed on the surface of overcoat layer 14 in association with the respective pixels. Data lines 12 are covered with color layers 13, and extend in a direction normal to the sheet of FIG. 1. Opposing substrate 20 comprises glass substrate 21 supporting on a transparent uniform common electrode 22 on one major surface thereof. TFT substrate 10 and opposing substrate 20 are spaced a given distance from each other with pixel electrodes 15 and common electrode 22 confronting each other. A liquid crystal layer 30 is sealed between TFT substrate 10 and opposing substrate 20. Each of data lines 12 is made of an opaque conductive material and serves to block gaps between two adjacent pixels against the entry of light. As well known to those skilled in the art, TFT substrate 10 also supports gate lines and TFTs associated with the respective pixels. The data lines are also referred to as video signal lines or drain lines and source lines, and the gate lines as scanning lines.

FIG. 2 shows an equivalent circuit of such an active matrix liquid crystal display device.

As shown in FIG. 2, pixel electrodes 15 and TFTs 41 which are associated with the respective pixels are arranged in a matrix form on TFT substrate 10. TFTs 41, which operate as switching elements, have gates connected to gate lines 42, drains connected to data lines 12, and sources connected to pixel electrodes 15. However, the sources of TFTs 41 may be connected to data lines 12, and the drains thereof to pixel electrodes 15. Common electrode 22 is grounded, and a liquid crystal layer sandwiched between common electrode 22 and one pixel electrode 15 serves as one pixel portion 40. On TFT substrate 10, gate lines 42 extend parallel to each other and perpendicularly to data lines 12. Equivalent pixel capacitors 43 are connected parallel to the respective pixel portions 40. Data lines 12 and gate lines 42 are driven respectively by drivers 44 and drivers 45.

It has been pointed out that the above conventional active matrix liquid crystal display device with the color filters on the TFT substrate has a smaller viewing angle than the active matrix liquid crystal display device with the color filters on the opposing substrate, even if it is provided with a phase difference compensation plate. Table 1 given below shows measured viewing angles in vertical and horizontal directions of active matrix liquid crystal display devices with color filters on TFT substrates and an active matrix liquid crystal display device with color filters on an opposing substrate. The values set forth in Table 1 were obtained with phase difference compensation plates used on these display devices.

TABLE 1

| | Type | | |
| --- | --- | --- | --- |
| | 9.4" UXGA | 12.1" SVGA | 12.1" SVGA |
| Pixel pitch | 120 μm | 300 μm | 300 μm |
| Color filter position | TFT substrate | TFT substrate | Opposing substrate |
| Viewing angle (Vertical) | 90 degrees | 92 degrees | 90 degrees |
| Viewing angle (Horizontal) | 90 degrees | 105 degrees | 110 degrees |

The viewing angle referred to above is an angle in which the ratio of contrast between white and black display images is 10% or higher. As can be seen from Table 1, the vertical viewing angle remains substantially the same irrespective of whether the color filters are disposed on the opposing substrate or the TFT substrate. However, the horizontal viewing angle is much smaller with the color filters disposed on the TFT substrate than with the color filters disposed on the opposing substrate. This tendency manifests itself if the pixels are smaller.

The above phenomenon will be described in detail below with reference to FIG. 1.

It is assumed that the conventional active matrix liquid crystal display device shown in FIG. 1 is used in a normally white mode. If pixels disposed one on each side of data line 12 displays a black image, then when the liquid crystal display device is driven by a dot inversion driving process, since a voltage of +5 V is applied to one of the pixel electrodes and a voltage of −5 V is applied to the other pixel electrode, a strong lateral electric field is generated in a region above data line 12 of liquid crystal layer 30, causing directors (liquid crystal molecules) 31 to fall thereby to substantially display a white image in that region. Specifically, as indicated by A in FIG. 1, a white image is displayed in the region of the gap between pixel electrodes 15 and a region slightly extending from the gap into the pixel electrodes. These regions are combined as a region where light leaks. In the other region, directors 31 are erected parallel to the direction from pixel electrodes 15 to common electrode 22, and a black image is displayed. When the white image region is viewed from the front of the active matrix liquid crystal display device, it is visually recognized as a black region because light is blocked by data line 12. When the white image region is obliquely viewed, as indicated by the arrow B, light is not blocked by data line 12, and liquid crystal layer 30 is affected by light that passes only through light leakage region A. While the region should be visually recognized as the black region, since there is light passing through liquid crystal layer 30 as indicated by the arrow B, the contrast in the black region is lowered, resulting in a reduction in the intensity of black in the black region.

If the liquid crystal display device is a highly fine display panel with small pixel pitches, then because the ratio of light leakage regions to ordinary pixel regions tends to be larger than a display panel with greater pixel pitches, the contrast in the black region as obliquely viewed is reduced, resulting in a smaller viewing angle. The ordinary pixel regions are referred to as normal regions where liquid crystal molecules are vertically oriented to display a black image.

The above phenomenon can occur with respect to the gate lines. However, inasmuch as a relatively large voltage is applied to the gate lines at all times unlike the data lines, and pixel electrodes are of a rectangular shape that is elongate parallel to the data lines in a color active matrix liquid crystal display device, the above phenomenon is not so noticeable as with the data lines, and does not lead to a substantial reduction in the viewing angle and visual perception.

In order to prevent the contrast from being lowered and also to prevent the viewing angle from being reduced, Japanese laid-open patent publication No. 10-104664 (JP, 10104664, A), for example, discloses an arrangement in which data lines have an increased width and overlap pixel electrodes with an overcoat layer interposed therebetween. The disclosed arrangement, however, is disadvantageous in that because the data lines need to be extremely large in width in order to achieve a desired viewing angle, the aperture ratio is lowered, and the layout of TFTs and auxiliary capacitors is limited.

SUMMARY OF THE INVENTION

It is therefore an object of the present invention to provide an active matrix liquid crystal display device which is capable of providing a wide viewing angle without the need for widened data lines even if color filters are disposed on a TFT substrate.

According to the present invention, the above object can be achieved by an active matrix liquid crystal display device comprising a first substrate (TFT substrate), a second substrate (opposing substrate) disposed in opposing relation to the first substrate, a liquid crystal layer sandwiched between the first substrate and the second substrate, a plurality of pixel electrodes arranged in a matrix on the first substrate, a plurality of switching elements disposed on the first substrate in association with the pixel electrodes, respectively, for driving the pixel electrodes, respectively, a plurality of data lines disposed on the first substrate at respective gaps between adjacent two of the pixel electrodes, for supplying data signals to the switching elements, a black matrix disposed on the first substrate in association with the data lines, for blocking light passing in a predetermined viewing angle range through a light leakage region created in the liquid crystal layer depending on a potential difference between adjacent two of the pixel electrodes.

The black matrix is provided to block light that passes through a light leakage region created in gaps between the pixel electrodes for thereby increasing the contrast as viewed in an oblique direction to increase a viewing angle. Therefore, dimensions of the black matrix are determined depending on a desired viewing angle and the extent of the light leakage region.

There is also provided a simple process of determining the extent of the black matrix in a direction perpendicular to the direction in which the data lines extend, i.e., the width of the black matrix.

In the active matrix liquid crystal display device according to the present invention, color layers of color filters are typically disposed on the first substrate. An overcoat layer may be disposed on the first substrate. With the overcoat layer disposed on the first substrate, the black matrix may be disposed below the overcoat layer, i.e., closely to the first substrate, or above the overcoat layer, i.e., closely to the liquid crystal layer.

Because the black matrix, i.e., a light shielding layer, is disposed on the TFT substrate, the active matrix liquid crystal display device can provide an increased viewing angle without widening the data lines even if the color filters are disposed on the TFT substrate.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
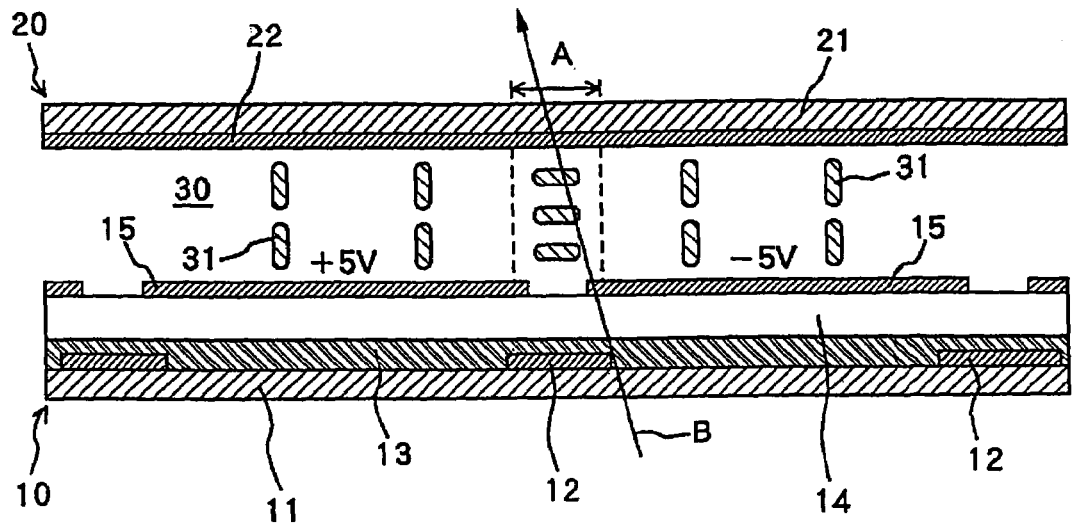
FIG. 1 is a schematic cross-sectional view of a conventional active matrix liquid crystal display device.
Figure 2:
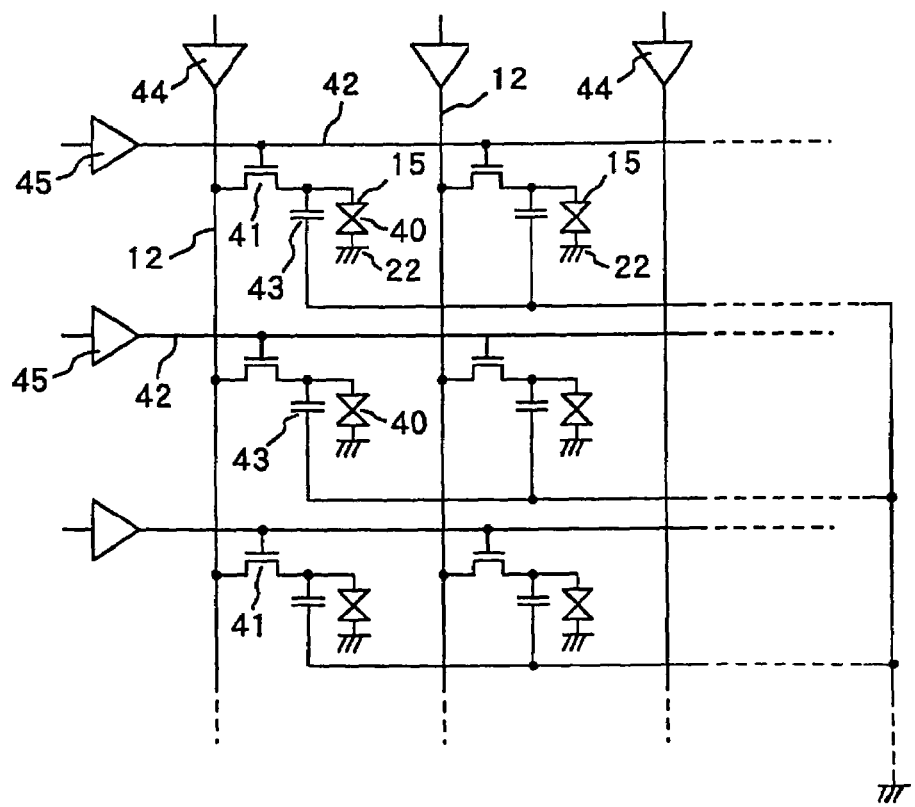
FIG. 2 is a circuit diagram of an equivalent circuit of a general active matrix liquid crystal display device.
Figure 3:
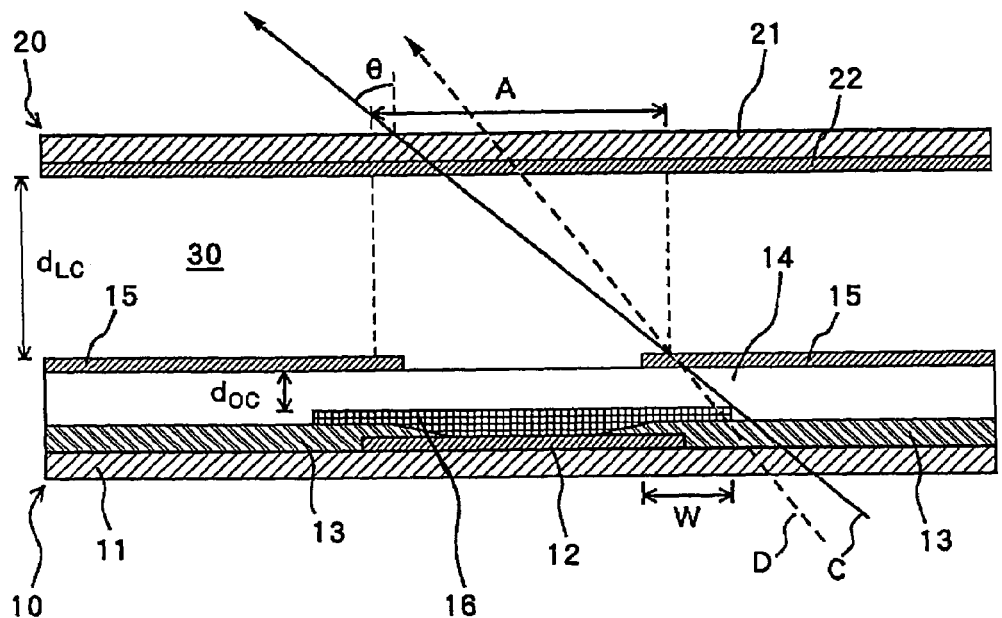
FIG. 3 is a schematic cross-sectional view of an active matrix liquid crystal display device according to a first embodiment of the present invention.

FIG. 3 shows in cross section an active matrix liquid crystal display device according to a first embodiment of the present invention. The liquid crystal display device shown in FIG. 3 is similar to the conventional liquid crystal display device shown in FIG. 1 in that color filters (color layers 13) are disposed on TFT substrate 10, but differs therefrom in that black matrix 16 serving as a light shielding layer for blocking light applied in an oblique direction is also disposed on TFT substrate 10. Those parts of the liquid crystal display device shown in FIG. 3 which are identical to those of the liquid crystal display device shown in FIG. 1 are denoted by identical reference numerals.

As shown in FIG. 3, TFT substrate 10 comprises transparent glass substrate 11 which supports on one major surface thereof a plurality of patterned data lines 12 extending parallel to each other, and color layers 13 of color filters disposed in regions of the major surface of glass substrate 11 which are not covered with data lines 12. Data lines 12 are made of an opaque conductive material, and extend in a direction normal to the sheet of FIG. 3. Color layers 13 have portions extending from edges of data lines 12 onto upper surfaces of data lines 12.

Black matrix 16 is disposed over data line 12 and extends in the same direction as data line 12. Black matrix 16 has a lower surface held against the upper surface of data line 12. Black matrix 16 extends laterally over the portions of color layers 13 that extend onto data line 12, and extends further toward centers of color layers 13 beyond portions thereof which correspond to the edges of data line 12. The width or distance by which black matrix 16 extends over the portions of color layers 13 will be described later on. Black matrix 16 is made of a material having a light shielding capability. In the present embodiment, black matrix 16 may be electrically conductive. However, if black matrix 16 is electrically conductive, then it makes data lines 12 electrically larger in width, possibly tending to adversely affect the electric characteristics of the liquid crystal display device. Therefore, black matrix 16 should preferably be made of an electrically insulating material such as a resin with a fine powder of carbon black dispersed therein, for example.

Transparent overcoat layer 14 is disposed in smoothly covering relation to the upper surface of color layers 13 and the upper surface of black matrix 16. Transparent pixel electrodes 15 associated with respective pixels are disposed on the upper surface of overcoat layer 14. Pixel electrodes 15 are arranged in a matrix form on overcoat layer 14, and made of ITO (indium-tin oxide), for example. Each of data lines 12 is disposed in alignment with the gap between two adjacent pixel electrodes 15.

TFT substrate 10 also supports thereon gate lines, not shown, and TFTs, not shown, associated with the respective pixels. The TFTs are supplied with data signals from data lines 12. The active matrix liquid crystal display device also has a pair of polarizers, not shown, and a phase difference compensation plate, not shown, as well known to those skilled in the art.

Opposing substrate 20, which is identical to the opposing substrate shown in FIG. 1, has transparent glass substrate 21 and transparent common electrode 22 of ITO, for example, disposed on transparent glass substrate 21. TFT substrate 10 and opposing substrate 20 are spaced a given distance from each other with pixel electrodes 15 and common electrode 22 confronting each other. A liquid crystal layer 30 is sealed between TFT substrate 10 and opposing substrate 20.

The transverse dimension or width of black matrix 16 will be described below. The transverse direction of black matrix 16 is a horizontal direction in FIG. 3. Black matrix 16 blocks light passing through light leakage region A in the gap between pixel electrodes 15, thereby increasing the contrast as viewed in an oblique direction and hence increasing a viewing angle. Light applied in an oblique direction and passing through a normal region other than light leakage region A is considerably reduced when it passes through the normal region when a voltage is applied to the pixel electrodes 15 in a normally white mode to display a black image. Therefore, such light is not considered as having a significant effect on a reduction in the contrast. The width of black matrix 16 may thus be determined depending on how large an angular range of light applied in an oblique direction and passing through only light leakage region A may be. Specifically, the width of black matrix 16 may be determined such that a light path C which is inclined to the normal to glass substrate 21 by θ and passes through an end of light leakage region A near overcoat layer 14 touches an end of black matrix 16, with a desired viewing angle being represented by 2θ. If the width of black matrix 16 is thus determined, then light that passes through light leakage region A without being blocked by data line 12 is blocked by black matrix 16, as indicated by the arrow D in FIG. 3.

Specifically, the position of light leakage region A is determined based on the thickness $d_{LC}$ of liquid crystal layer 30, the thickness $d_{OC}$ of overcoat layer 14, electrical properties of liquid crystal layer 30, spaced intervals and layout of pixel electrodes 15, and optical properties such as refractive indexes of the various layers, and the width of black matrix 16 may be determined to obtain a desired viewing angle based on the determined position of light leakage region A.

The width of black matrix 16 can be determined in this manner according to a known simulation technique. However, since there are many factors involved in determining the width of black matrix 16, a large amount of calculations is required to determine an optimum width for black matrix 16. The inventor of the present invention has conducted experiments and found a simpler process of determining the dimension of black matrix 16. This simpler process of determining the dimension of black matrix 16 will be described below.

With a liquid crystal display device that is presently manufactured, each of the thickness $d_{LC}$ of liquid crystal layer 30, the gap between adjacent pixel electrodes 15, and the thinkness $d_{OC}$ of overcoat layer 14 on black matrix 16 is considered to be in the range from several micrometers to ten and several micrometers. When such a liquid crystal display device is used in a normally white mode and a black image is displayed on each of adjacent pixels positioned across data line 12, i.e., black matrix 16, light leakage region A is created by a lateral electric field produced between pixel electrodes 15 or a reduction in a vertical electric field in a region between pixel electrodes 15. Light leakage region A is not limited to a region corresponding to the gap between pixel electrodes 15, but extends somewhat from the edges of pixel electrodes 15 toward the centers of pixel electrodes 15. In the arrangement shown in FIG. 3, since black matrix 16 is disposed below pixel electrodes 15 with overcoat layer 14 interposed therebetween, the width of black matrix 16 needs to be larger than the gap between pixel electrodes 15. Black matrix 16 overlaps pixel electrodes 15 by distances or widths W.

The lateral electric field in liquid crystal layer 30 obviously varies depending on whether a voltage is applied to each pixel electrode 15 according to a dot inversion driving process or a gate line inversion driving process. The inventor has studied the above presently manufactured liquid crystal display device in view of the above different drive processes, and has found that, with the viewing angle being represented by 2θ, the width W of the overlapping regions may be determined to meet the following condition:

$W \geq d_{LC}/2 + d_{OC} \cdot \tan\theta$ for the dot inversion driving process; and $W \geq d_{LC}/4 + d_{OC} \cdot \tan\theta$ for the gate line inversion driving process.

The viewing angle referred to above is an angle in which the ratio of contrast between white and black display images is 10% or higher. This definition of the viewing angle will also be used hereinbelow.

It is preferable to reduce the width W while satisfying the above expressions because an unduly increase in the width W results in a reduction in the aperture ratio.

Table 2 given below shows the relationship between the viewing angle 2θ in which the ratio of contrast between white and black display images is 10% or higher and the width W of overlapping regions of liquid crystal display panels of 9.4" UXGA (the pixel pitch of 120 μm) with phase difference compensation plates, where the thinkness $d_{LC}$ of liquid crystal layer 30 is 4.5 μm, the gap between adjacent pixel electrodes 15 is 6 μm, and the thinkness $d_{OC}$ of overcoat layer 14 on black matrix 16 ranges from 0.5 to 30 μm, and a voltage is applied according to the dot inversion driving process. It can be understood from Table 2 that good display characteristics and viewing angle characteristics can be obtained by determining the width W to satisfy the above formulae.

TABLE 2

| Overcoat layer thickness $d_{OC}$ | Overlapping region width W | Viewing angle 2θ | Aperture ratio |
| --- | --- | --- | --- |
| 2 μm | 2 μm | 85 degrees | 50% |
|  | 3 μm | 90 degrees | 45% |
|  | 4 μm | 100 degrees | 40% |
| 1 μm | 2 μm | 100 degrees | 50% |
|  | 3 μm | 110 degrees | 45% |
|  | 4 μm | 120 degrees | 40% |
| 0.5 μm | 2 μm | 110 degrees | 50% |
|  | 3 μm | 120 degrees | 45% |
|  | 4 μm | 120 degrees | 40% |

A review of Table 2 indicates that it is necessary to set the thickness of the overcoat layer on the black matrix to 1 μm or less in order to obtain good viewing angle characteristics represented by a horizontal viewing angle of 110 degrees or greater without reducing the aperture ratio from 45 to 50%. The horizontal viewing angle of 110 degrees or greater is based on the performance of the phase difference compensation plate.

Unless steps ranging from 1 to 2 μm on the black matrix are planarized, the directors of the liquid crystal are disturbed, causing an orientation failure. In view of this, the overcoat layer needs to be thin and the black matrix needs to be planarized by reducing maximum steps to 0.5 μm or less. Experimentation conducted by the inventor has shown that steps of the black matrix can be planarized and the thickness of the overcoat layer on the black matrix can be reduced to 1 μm or less by spin-coating an acrylic resin (PC405, PC415 manufactured by JSR) having a viscosity in the range from 5 to 15 mPa·s (5 to 15 cP) at the time of coating, as the overcoat layer.

In the present embodiment, a black matrix is newly deposited on the color layers. However, adjacent color layers may be arranged in overlapping relation to provide a function equivalent to a black matrix.

Figure 4:
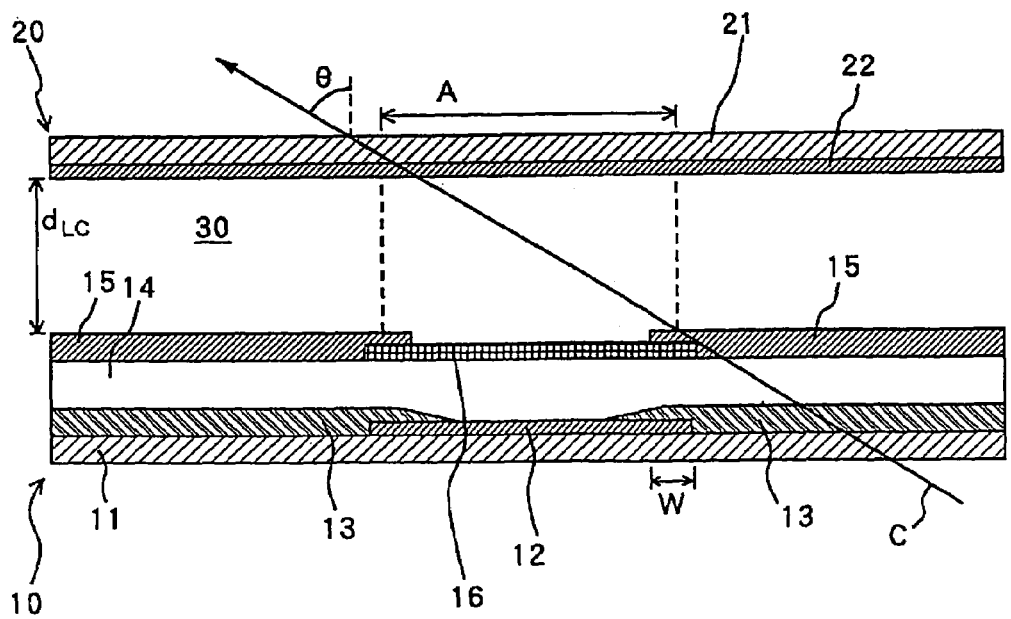
FIG. 4 is a schematic cross-sectional view of an active matrix liquid crystal display device according to a second embodiment of the present invention.

FIG. 4 shows an active matrix liquid crystal display device according to a second embodiment of the present invention. The liquid crystal display device shown in FIG. 4 is similar to, but differs from, the liquid crystal display device shown in FIG. 3 in that black matrix 16 is disposed on the surface of the overcoat layer 14 closer to liquid crystal layer 30, but not on the surface of the overcoat layer 14 closer to data lines 12. Those parts of the liquid crystal display device shown in FIG. 4 which are identical to those of the liquid crystal display device shown in FIG. 3 are denoted by identical reference numerals.

In the liquid crystal display device shown in FIG. 4, black matrix 16 is disposed above data lines 12. Pixel electrodes 15 have edges covering black matrix 16. Since black matrix 16 is held in contact with a plurality of pixel electrodes 15, black matrix 16 needs to be made of an electrically insulating material. If black matrix 16 is made of a material having a high dielectric constant, then it can lessen the lateral electric field between pixel electrodes 15 in liquid crystal layer 30, allowing light leakage region A to be reduced in width.

With the liquid crystal display device shown in FIG. 4, the width of black matrix 16 may be determined depending on how large an angular range of light applied in an oblique direction and passing through only light leakage region A may be. Specifically, the position of light leakage region A is determined based on the thinkness $d_{LC}$ of liquid crystal layer 30, electrical properties of liquid crystal layer 30, spaced intervals and layout of pixel electrodes 15, and optical properties such as refractive indexes of the various layers, and the width of black matrix 16 may be determined to obtain a desired viewing angle based on the determined position of light leakage region A. According to a simpler process of determining the width of black matrix 16, which has been found by the present inventor, the thickness of the pixel electrodes is ignored, and the width W of the overlapping regions of pixel electrodes 15 and black matrix 16 is determined to meet the following condition:

$W \geq d_{LC}/2$ for the dot inversion driving process; and $W \geq d_{LC}/4$ for the gate line inversion driving process.

In the liquid crystal display device shown in FIG. 4, the width W can be smaller than the width W in the liquid crystal display device shown in FIG. 3, and the aperture ratio in FIG. 4 can be larger than the aperture ratio in the liquid crystal display device shown in FIG. 3.

Figure 5:
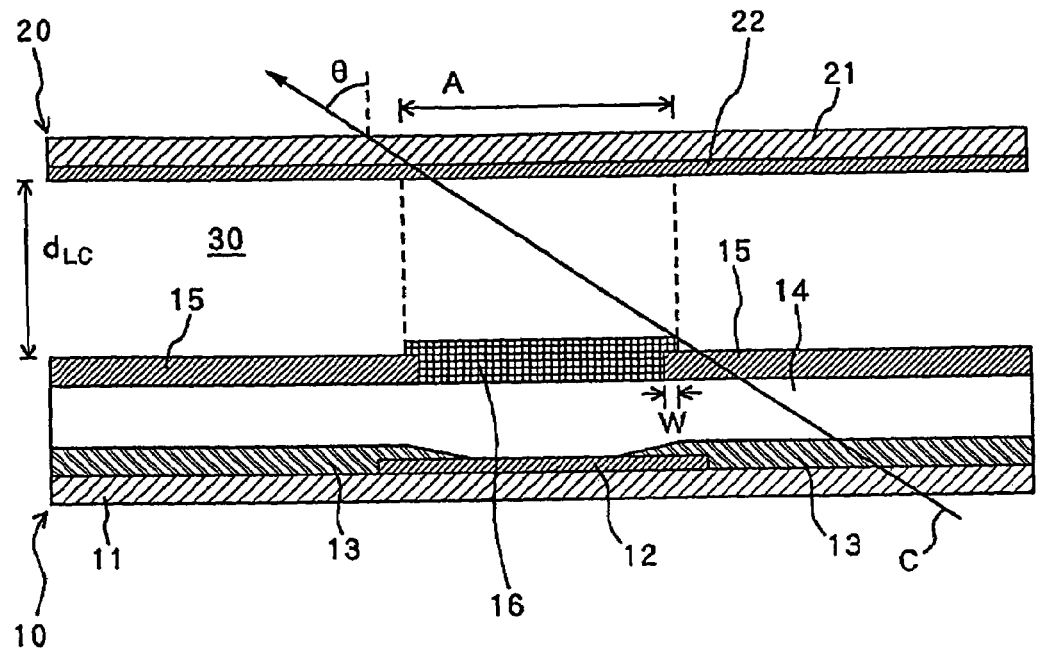
FIG. 5 is a schematic cross-sectional view of an active matrix liquid crystal display device according to a third embodiment of the present invention.

FIG. 5 shows an active matrix liquid crystal display device according to a third embodiment of the present invention. The liquid crystal display device shown in FIG. 5 is similar to, but differs from, the liquid crystal display device shown in FIG. 4 in that black matrix 16 disposed on overcoat layer 14 extends over edges of pixel electrodes 15. Those parts of the liquid crystal display device shown in FIG. 5 which are identical to those of the liquid crystal display device shown in FIG. 4 are denoted by identical reference numerals.

With the active matrix liquid crystal display device shown in FIG. 5, as with the liquid crystal display device shown in FIG. 3, the width of black matrix 16 may be determined depending on how large an angular range of light applied in an oblique direction and passing through only light leakage region A may be. Specifically, the position of light leakage region A is determined based on the thinkness $d_{LC}$ of liquid crystal layer 30, electrical properties of liquid crystal layer 30, spaced intervals and layout of pixel electrodes 15, and optical properties such as refractive indexes of the various layers, and the width of black matrix 16 may be determined to obtain a desired viewing angle based on the determined position of light leakage region A. According to a simpler process of determining the width of black matrix 16, which has been found by the present inventor, the thickness of the pixel electrodes is ignored, and the width W of the overlapping regions of pixel electrodes 15 and black matrix 16 is determined to meet the following condition:

$W \geq d_{LC}/2$ for the dot inversion driving process; and $W \geq d_{LC}/4$ for the gate line inversion driving process.

In the liquid crystal display device shown in FIG. 5, the width W can further be reduced, and the aperture ratio can further be increased.

Figure 6:
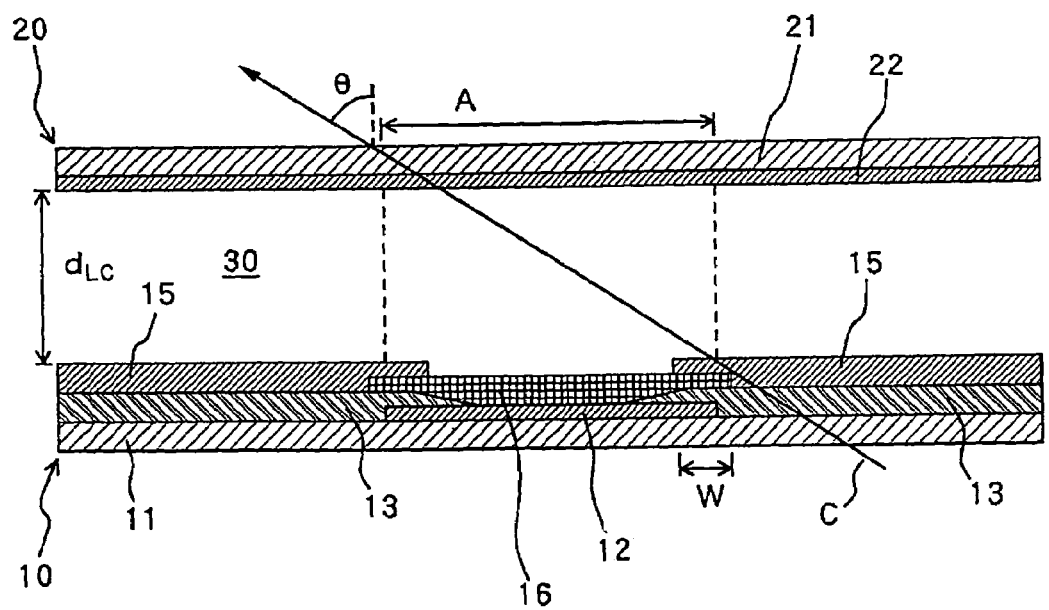
FIG. 6 is a schematic cross-sectional view of an active matrix liquid crystal display device according to a fourth embodiment of the present invention.

FIG. 6 shows an active matrix liquid crystal display device according to a fourth embodiment of the present invention. The liquid crystal display device shown in FIG. 6 differs from the liquid crystal display device shown in FIG. 3 in that it has no overcoat layer. Pixel electrodes 15 are disposed directly on color layers 13, and have edges covering black matrix 16. Black matrix 16 is made of an electrically insulating material having a high dielectric constant. Those parts of the liquid crystal display device shown in FIG. 6 which are identical to those of the liquid crystal display device shown in FIG. 3 are denoted by identical reference numerals.

An overcoat layer would be used to lessen the lateral electric field applied to liquid crystal layer 30. If black matrix 16 is made of a material having a high dielectric constant, then black matrix 16 itself is effective to lessen the lateral electric field between pixel electrodes 15 in liquid crystal layer 30, make it possible to dispense with such an overcoat layer.

With the liquid crystal display device shown in FIG. 6, as with the liquid crystal display device shown in FIG. 3, the width of black matrix 16 may be determined depending on how large an angular range of light applied in an oblique direction and passing through only light leakage region A may be. Specifically, the position of light leakage region A is determined based on the thinkness $d_{LC}$ of liquid crystal layer 30, electrical properties of liquid crystal layer 30, spaced intervals and layout of pixel electrodes 15, and optical properties such as refractive indexes of the various layers, and the width of black matrix 16 may be determined to obtain a desired viewing angle based on the determined position of light leakage region A. According to a simpler process of determining the width of black matrix 16, which has been found by the present inventor, the thickness of the pixel electrodes is ignored, and the width W of the overlapping regions of pixel electrodes 15 and black matrix 16 is determined to meet the following condition:

$W \geq d_{LC}/2$ for the dot inversion driving process; and $W \geq d_{LC}/4$ for the gate line inversion driving process.

In the liquid crystal display device shown in FIG. 6, inasmuch no overcoat layer is provided, the width W can be smaller than the width W in the liquid crystal display device shown in FIG. 3, and the aperture ratio can be larger than the aperture ratio in the liquid crystal display device shown in FIG. 3.

While preferred embodiments of the present invention have been described using specific terms, such description is for illustrative purposes only, and it is to be understood that changes and variations may be made without departing from the spirit or scope of the following claims.

What is claimed is:

1. An active matrix liquid crystal display device comprising:
   a first substrate;
   a second substrate disposed in opposing relation to said first substrate;
   a liquid crystal layer sandwiched between said first substrate and said second substrate;
   a plurality of pixel electrodes arranged in a matrix on said first substrate;
   a plurality of switching elements disposed on said first substrate in association with said pixel electrodes, respectively, for driving the pixel electrodes, respectively;
   a plurality of data lines disposed on said first substrate at respective gaps between adjacent two of said pixel electrodes, for supplying data signals to said switching elements; and
   a black matrix disposed on said first substrate in association with said data lines, for blocking light passing in a predetermined viewing angle range through a light leakage region created in said liquid crystal layer depending on a potential difference between adjacent two of said pixel electrodes.

2. An active matrix liquid crystal display device according to claim 1, further comprising:
   color layers disposed on said first substrate, said color layers constituting color filters.

3. An active matrix liquid crystal display device according to claim 2, wherein said black matrix comprises an electrically insulating material, and said switching elements comprise thin-film transistors.

4. An active matrix liquid crystal display device comprising:
   a first substrate;
   a second substrate disposed in opposing relation to said first substrate;
   a liquid crystal layer sandwiched between said first substrate and said second substrate;
   an overcoat layer disposed on said first substrate in covering relation to said first substrate;
   a plurality of pixel electrodes arranged in a matrix on said overcoat layer;
   a plurality of switching elements disposed on said first substrate in association with said pixel electrodes, respectively, for driving the pixel electrodes, respectively;
   a plurality of data lines disposed on said first substrate, for supplying data signals to said switching elements, said data lines being covered with said overcoat layer; and
   a black matrix disposed on a surface of said overcoat layer on said first substrate, at least a portion of said black matrix being formed over said data lines;
   said data lines being disposed at respective gaps between adjacent two of said pixel electrodes;
   said black matrix being arranged to block light passing in a predetermined viewing angle range through a light leakage region created in said liquid crystal layer depending on a potential difference between adjacent two of said pixel electrodes.

5. An active matrix liquid crystal display device according to claim 4, further comprising:
   color layers disposed on said first substrate, said color layers constituting color filters.

6. An active matrix liquid crystal display device according to claim 5, wherein said black matrix comprises an electrically insulating material, and said switching elements comprise thin-film transistors.

7. An active matrix liquid crystal display device driven by a gate line inversion driving process, said active matrix liquid crystal display device comprising:
   a first substrate with a plurality of switching elements disposed thereon;

a second substrate disposed in opposing relation to said first substrate; a liquid crystal layer sandwiched between said first substrate and said second substrate;

a plurality of data lines disposed on said first substrate, for supplying data signals to said switching elements;

an overcoat layer disposed on said first substrate in covering relation to said data lines and said first substrate;

a plurality of pixel electrodes arranged in a matrix on said overcoat layer; and a black matrix disposed on said data lines;

said pixel electrodes being driven by said switching elements, respectively;

said data lines being disposed at respective gaps between adjacent two of said pixel electrodes;

said black matrix having a portion overlapping said pixel electrodes, said portion having a width W represented by:

$$W \geq d_{LC}/4 + d_{OC} \cdot \tan \theta$$

where $d_{LC}$ represents a thickness of said liquid crystal layer, $d_{OC}$ represents a thickness of said overcoat layer on said black matrix, and $\theta$ represents one-half of a given viewing angle $2\theta$.

8. An active matrix liquid crystal display device according to claim 7, wherein the thickness $d_{OC}$ of said overcoat layer on said black matrix is at most 1 μm, and said overcoat layer planarizes steps of said black matrix to at most 0.5 μm.

9. An active matrix liquid crystal display device comprising:

a first substrate with a plurality of switching elements disposed thereon;

a second substrate disposed in opposing relation to said first substrate;

a liquid crystal layer sandwiched between said first substrate and said second substrate;

a plurality of data lines disposed on said first substrate, for supplying data signals to said switching elements;

an overcoat layer disposed on said first substrate in covering relation to said data lines and said first substrate;

a plurality of pixel electrodes arranged in a matrix on said overcoat layer; and a black matrix formed on said first substrate, at least a portion of said black matrix being disposed on said data lines;

said pixel electrodes being driven by said switching elements, respectively;

said data lines being disposed at respective gaps between adjacent two of said pixel electrodes;

said black matrix being disposed in a position above said data lines and arranged to block light passing in a predetermined viewing angle range through a light leakage region created in said liquid crystal layer depending on a potential difference between adjacent two of said pixel electrodes.

10. An active matrix liquid crystal display device according to claim 9, further comprising color layers disposed on said first substrate, said color layers constituting color filters.

11. An active matrix liquid crystal display device according to claim 10, wherein said black matrix comprises an electrically insulating material, and said switching elements comprise thin-film transistors.

12. An active matrix liquid crystal display device comprising:

a first substrate with a plurality of switching elements disposed thereon;

a second substrate disposed in opposing relation to said first substrate;

a liquid crystal layer sandwiched between said first substrate and said second substrate;

a plurality of data lines disposed on said first substrate, for supplying data signals to said switching elements;

color layers of color filters disposed in at least regions of said first substrate which are free of said data lines;

a plurality of pixel electrodes disposed on said color layers and arranged in a matrix; and a black matrix of an electrically insulating material disposed on said data lines, said pixel electrodes being driven by said switching elements, respectively, said data lines being disposed at respective gaps between adjacent two of said pixel electrodes;

said black matrix being arranged to block light passing in a predetermined viewing angle range through a light leakage region created in said liquid crystal layer depending on a potential difference between adjacent two of said pixel electrodes.

13. An active matrix liquid crystal display device according to claim 1, wherein said pixel electrodes comprise a portion extending over said black matrix, said portion having a width W represented by:

$$W \geq d_{LC}/2$$

where $d_{LC}$ represents a thickness of said liquid crystal layer.

14. An active matrix liquid crystal display device according to claim 1, wherein said pixel electrodes comprise a portion extending over said black matrix, said portion having a width W represented by:

$$W \geq d_{LC}/4$$

where $d_{LC}$ represents a thickness of said liquid crystal layer.

15. An active matrix liquid crystal display device according to claim 1, wherein said black matrix comprises a portion extending over said pixel electrodes, said portion having a width W represented by:

$$W \geq d_{LC}/2$$

where $d_{LC}$ represents a thickness of said liquid crystal layer.

16. An active matrix liquid crystal display device according to claim 1, wherein said black matrix comprises a portion extending over said pixel electrodes, said portion having a width W represented by:

$$W \geq d_{LC}/4$$

where $d_{LC}$ represents a thickness of said liquid crystal layer.

17. An active matrix liquid crystal display device according to claim 1, wherein said black matrix is formed between said first substrate and said liquid crystal layer.

18. An active matrix liquid crystal display device according to claim 1, wherein at least a portion of said black matrix is formed between said data lines and said liquid crystal layer.

19. An active matrix liquid crystal display device according to claim 1, further comprising:

an overcoat layer formed on said first substrate and said data lines, wherein said black matrix is formed on said overcoat layer.

20. An active matrix liquid crystal display device according to claim 1, further comprising:

an overcoat layer formed on said first substrate and said data lines, wherein said overcoat layer is formed on said black matrix.

21. A thin film transistor (TFT) substrate for an active matrix liquid crystal display device, comprising:
   a substrate;
   a plurality of switching elements and a plurality of data lines for supplying data signals to said switching elements formed on said substrate;
   an overcoat layer formed on said substrate and on said data lines;
   a plurality of pixel electrodes formed on said overcoat layer, said pixel electrodes being driven by said switching elements, respectively, and a data line of said plurality of data lines being formed near a space between adjacent pixel electrodes in said plurality of pixel electrodes;
   a black matrix formed on said substrate in an area of said data line, for blocking light passing in a predetermined viewing angle range through a light leakage region created in a liquid crystal layer of said active matrix liquid crystal display.

* * * * *